United States Patent Office 3,660,373
Patented May 2, 1972

---

3,660,373
PHENYL-AZO-HYDROXYNAPHTHOIC ACID AMIDE PIGMENTS
Armand Roueche, Neu-Allschwil, Switzerland, assignor to Ciba Limited, Basel, Switzerland
No Drawing. Filed Nov. 24, 1969, Ser. No. 879,615
Claims priority, application Switzerland, Dec. 12, 1968, 18,513/68
Int. Cl. C07b 29/20; C07c 107/08
U.S. Cl. 260—203
6 Claims

---

ABSTRACT OF THE DISCLOSURE

Azo pigments of the formula $$R_1-N=N-R_2-CONH-R_3-X-NHCONHR_4$$
$$\text{(with OH on } R_2\text{)}$$

in which $R_1$ represents an aromatic radical, $R_2$ represents a naphthalene radical in which the azo, hydroxy and —CO— groups are in 1,2,3-position, $R_3$ represents an arylene radical, X represents a direct bond or a —CO— group, and $R_4$ represents a carbamide group, an acylamino group or an acyl or carbalkoxyalkyl radical when X represents a direct bond, and $R_4$ represents an alkyl or aryl radical when X represents a —CO— group. They are useful for coloring plastics and lacquers in orange to red shades.

---

This invention is based on the observation that valuable new azo pigments of the formula (1)
$$R_1-N=N-R_2-CONH-R_3-X-NHCONH-R_4$$
$$\text{(with OH on } R_2\text{)}$$

in which $R_1$ represents an aromatic residue, $R_2$ represents a naphthalene residue in which the azo, hydroxy and —CO— groups are in 1,2,3-position, $R_3$ represents an arylene residue, X represents a direct bond or a —CO— group and $R_4$ represents a carbamide group that may be substituted by alkyl or aryl residues, an acylamino group, for example, a benzoylamino, formylamino, or alkanoylamino group, an acyl residue, for example, an alkanoyl, benzoyl or carbalkoxy group or a carbalkoxyalkyl group when X represents a direct bond, and $R_4$ represents an alkyl or aryl group when X is a —CO— group, may be obtained (a) by condensing a carboxylic acid halide of the formula (2)
$$R_1-N=N-R_2-COHal$$
$$\text{(with OH on } R_2\text{)}$$

with an amine of the formula (3) $\quad H_2N-R_3-X-NHCONH-R_4$ or (b) coupling a diazo or diazoamino compound of an aromatic amine with a coupling component of the formula (4)
$$R_2-CONH-R_3-X-NHCONH-R_4$$
$$\text{(with OH on } R_2\text{)}$$

Since the products of the invention are pigments, they must not contain groups imparting solubility in water, especially acid groups imparting solubility in water, for example, sulphonic acid groups or carboxylic acid groups.

The carboxylic acids from which the acid halides required for process (a) of the invention are derived may be obtained by coupling a diazo compound of a carbocyclic or heterocyclic aromatic amine, especially an aminobenzene, with a 2,3-hydroxynaphthoic acid of the formula

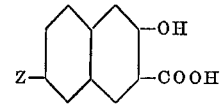

in which Z represents a hydrogen or a halogen atom or a nitro, cyano or alkoxy group.

Diazo components that are of special interest are those of the formula (6) 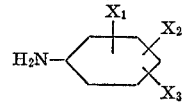

in which $X_1$ represents a hydrogen or a halogen atom or an alkyl group and $X_2$ and $X_3$ each represents a hydrogen or a halogen atom or an alkyl, alkoxy, phenoxy, nitro, cyano, carboxylic acid ester, alkylsulphonyl, aralkylsulphonyl, trifluoromethyl, sulphonic acid amide or sulphonic acid ester group or a group of the formula —CONHR, in which R represents a hydrogen atom, an alkyl group or a phenyl group that may be substituted, for example, by halogen atoms ar alkyl, trifluoromethyl, alkoxy, nitro, cyano, carbalkoxy or alkanoylamino groups.

The following aminobenzenes are given as examples of diazo components:

2-, 3- or 4-chloroaniline,
3,4-dichloroaniline,
2,3-dichloroaniline,
2,4-dichloroaniline,
2,5-dichloroaniline,
2,6-dichloroaniline,
2,4,5-trichloroaniline,
2,4,6-trichloroaniline,
2-, 3- or 4-bromoaniline,
2,4-dibromoaniline,
2,5-dibromoaniline,
2-methyl-5-chloroaniline,
2-methyl-4-chloroaniline,
2-methyl-3-chloroaniline,
2-chloro-5-trifluoromethylaniline,
2-, 3- or 4-nitroaniline,
4-chloro-2-nitroaniline,
2-chloro-4-nitroaniline,
2-nitro-4-trifluoromethylaniline,
4-nitro-2-trifluoromethylaniline,
3,5-di-(trifluoromethyl)-aniline,
3-trifluoromethylaniline,
4-methyl-3-nitroaniline,
2,4-dimethyl-3-nitroaniline,
2-methly-5-nitroaniline,
2-methyl-4-nitroaniline,
2- and 4-methoxyaniline,
3-chloro-4-methoxyaniline,
2-methoxy-5-nitroaniline,
2-methoxy-5-chloroaniline,
2-methoxy-5-trifluoromethylaniline,
2-amino-4-trifluoromethyl-4'-chlorodiphenylether,
2-nitro-4-ethoxyaniline,
2-amino-4-chlorodiphenylether,
2-amino-2',4-dichlorodiphenylether,
2-amino-4,4'-dichlorodiphenylether,
1-aminobenzene-2-carboxylic acid methylester,
1-amino-2-chlorobenzene-5-carboxylic acid methylester,
1-amino-2-chlorobenzene-5-carboxylic acid phenylester,
2-amino-5-nitrobenzoic acid methylester,
1-amino-2-methylbenzene-5-carboxylic acid methylester,
1-amino-2-methylbenzene-5-carboxylic acid phenylester,
1-amino-2-chlorobenzene-5-carboxylic acid methylamide,
2-amino-4-trifluoromethyldiphenylether, 4-methyl-3-aminobenzoic acid amide,
4-chloro-3-aminobenzoic acid amide,
2,4-dichloro-5-aminobenzoic acid amide,
4-methoxy-3-aminobenzoic acid amide,
4-methyl-3-aminobenzoic acid-2'-chloro-5'-trifluoromethylanilide,
4-chloro-3-aminobenzoic acid-2',5'-dichloroanilide,
4-chloro-3-aminobenzoic acid-2'-chloro-5'-carbomethoxyanilide,
4-chloro-3-aminobenzoic acid-3'-chloroanilide,
4-chloro-3-aminobenzoic acid-2'-chloro-5'-trifluoromethylanilide,
4-chloro-3-aminobenzoic acid-3'-trifluoromethylanilide,
4-chloro-3-aminobenzoic acid-3',5'-bis-trifluoromethylanilide,
4-chloro-3-aminobenzoic acid-2',4',5'-trichloroanilide,
2,4-dichloro-5-aminobenzoic acid-2',5'-dichloroanilide,
2,4-dichloro-5-aminobenzoic acid-2',4'-dichloroanilide,
2,4-dichloro-5-aminobenzoic acid-3'-trifluoromethylanilide,
2,4-dichloro-5-aminobenzoic acid-3'-chloroanilide,
5-amino-4-methoxy-2-chlorobenzoic acid-3'-trifluoromethylanilide,
4-methyl-3-aminobenzoic acid-2',5'-dichloroanilide,
4-methyl-3-aminobenzoic acid-3'-trifluoromethylanilide,
4-methoxy-3-aminobenzoic acid-3'-chloroanilide,
4-methoxy-3-aminobenzoic acid-2',5'-dichloroanilide,
4-methoxy-3-aminobenzoic acid-2',4',5'-trichloroanilide,
4-carbomethoxy-3-aminobenzoic acid anilide,
4-methoxy-3-aminobenzoic acid-3'-trifluoromethylanilide,
4-carbethoxy-3-aminobenzoic acid-2',5'-dichloroanilide,
4-methoxy-3-aminobenzoic acid-3',5'-bis-trifluoromethylanilide,
4-methoxy-3-aminobenzoic acid-2'-chloro-5'-trifluoromethylanilide,
4-methoxy-3-aminobenzoic acid-2',5'-dimethoxy-4'-chloroanilide,
4-methoxy-3-aminobenzoic acid-2',5'-dimethyl-4'-chloroanilide,
4-aminobenzoic acid-2',4'-dichlorophenylamide,
4-aminobenzoic acid-2'-chloro-5'-trifluoromethylphenylamide,
4-amino-3-methylbenzoic acid-3'-trifluoromethylphenylamide,
4-amino-3-methylbenzoic acid-4'-chlorophenylamide,
4-amino-3-nitrobenzoic acid-2',5'-dichlorophenylamide,
4-amino-3-methylbenzoic acid methylester,
4-amino-3-methylbenzoic acid phenylester,
4-methoxy-3-aminobenzoic acid phenylester, and
4-methyl-3-aminobenzoic acid-para-chlorophenylester.

The azo dystuff carboxylic acids obtained are treated with substances which are capable of converting carboxylic acids into their acid halides, for example, their acid chlorides or bromides, such substances being, in particular, phosphorus halides, for example phosphorus pentabromide, phosphorus pentachloride or phosphorus trichloride, phosphorus oxyhalides and preferably thionyl chloride.

The treatment with the said acid halogenating agents is advantageously carried out in an inert organic solvent, for example dimethylformamide, a chlorobenzene, for example monochlorobenzene or a dichlorobenzene, toluene, xylene or nitrobenzene. If desired, dimethylformamide may be used in conjunction with the last five solvents specified. When preparing the carboxylic acid halides, it is generally advantageous first to dry the azo compounds which are prepared in an aqueous medium, or to free them from water by azeotropic distillation in an organic solvent. If desired, azeotropic drying may be carried out immediately prior to the treatment with the acid halogenating agents.

The azo dyestuff carboxylic acid chlorides so obtained are condensed with amines of the Formula 3, especially with those of the formulae

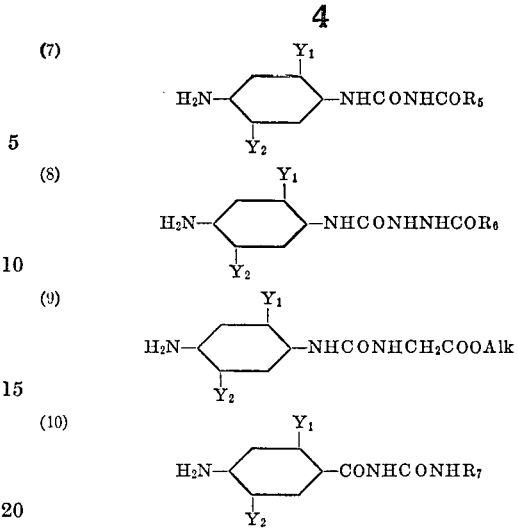

in which $Y_1$ and $Y_2$ each represents a hydrogen or a halogen atom or an alkyl or alkoxy group, $R_5$ represents an amino or alkylamino group, a phenylamino group that may be substituted in the phenyl residue, for example, by halogen atoms or alkyl, alkoxy, trifluoromethyl, cyano, carbalkoxy or alkanoylamino groups, an alkyl or alkoxy group or a phenyl residue that may be substituted, $R_6$ represents a hydrogen atom or an alkyl group or a phenyl residue that may be substituted, "alk" represents an alkyl group and $R_7$ represents an alkyl group or a phenyl residue that may be substituted, for example, by halogen atoms or by alkyl, alkoxy, trifluoromethyl, cyano, carbalkoxy or alkanoylamino groups.

The following amines are given as examples:

4-aminophenyl-1-biuret,
4-amino-2,5-dimethylphenyl-1-biuret,
4-amino-2,5-dichlorophenyl-1-biuret,
4-amino-3-chloro-6-methoxyphenyl-1-biuret,
4-amino-2-methylphenyl-1-biuret,
4-amino-2-chlorophenyl-1-biuret,
4-amino-2-methoxyphenyl-1-biuret,
4-amino-2,5-dimethoxyphenyl-1-biuret,
3-amino-4-chlorophenyl-1-biuret,
4-amino-2,5-diethoxyphenyl-1-biuret,
3-amino-4-methylphenyl-1-biuret,
N-(4-aminophenyl)-N'-phenylbiuret,
N-(4-amino-2,5-dimethylphenyl)-N'-phenylbiuret,
N-(4-amino-2,5-dichlorophenyl)-N'-phenylbiuret,
N-(4-aminophenyl)-N'-acetylbiuret,
N-(4-amino-2-methylphenyl)-N'-phenylbiuret,
N-(4-aminophenyl)-N'-(3',4'-dichlorophenyl)-biuret,
N-(4-aminophenyl)-N'-(4'-methoxyphenyl)-biuret,
N-(4-amino-2,5-dimethylphenyl)-N'-(4'-chlorophenyl)-biuret,
N-(4-amino-2,5-dichlorophenyl)-N'-(2'-methylphenyl)-biuret,
N-(4-aminophenyl)-N'-(3'-trifluoromethylphenyl)-biuret,
N-(3-amino-4-chlorophenyl)-N'-phenylbiuret,
1-(4'-amino)-phenylcarbamyl-2-benzoylhydrazine,
1-(4'-amino-2',5'-dimethyl)-phenylcarbamyl-2-benzoylhydrazine,
1-(4'-amino-2',5'-dichloro)-phenylcarbamyl-2-(4"-chlorobenzoyl)-hydrazine,
1-(4"-amino)-phenylcarbamyl-2-(4"-methylbenzoyl)-hydrazine,
1-(4'-amino)-phenylcarbamyl-2-formylhydrazine,
1-(4'-amino)-phenylcarbamyl-2-(2",4"-dichlorobenzoyl)-hydrazine,
1-(3'-amino-4'-methyl)-phenylcarbamyl-2-(4"-benzoyl)-hydrazine,
1-(4'-amino-3'-chloro-6'-methoxy)-phenylcarbamyl-2-benzoylhydrazine, 1-(4'-amino)-phenylcarbamyl-2-acetylhydrazine,
γ-(4-aminophenyl)-allophanic acid ethylester,
γ-(4-amino-2,5-dimethyl)-allophanic acid ethylester,
γ-(4-amino-2,5-dichloro)-allophanic acid methylester,
N-(4-amino-3-chloro-6-methoxyphenyl)-N'-acetic acid methylester urea,
N-(4-aminophenyl)-N'-acetic acid methylester urea,
N-(4-aminophenyl)-N'-acetic acid ethylester urea,
N-(4-amino-2,5-dimethylphenyl)-N'-acetic acid methylester urea,
N-(3-chloro-4-amino-6-methoxyphenyl)-N'-benzoylurea,
N-(3-amino-4-methylphenyl)-N'-benzoylurea,
N-(4-amino-2,5-dichlorophenyl)-N'-benzoylurea,
N-(4-amino-2,5-dimethylphenyl)-N'-acetylurea,
N-(4-aminophenyl)-N'-(2',5'-dichlorobenzoyl)-urea,
N-(4-aminophenyl)-N'-(4'-methoxybenzoyl)-urea,
N-(4-amino-2,5-dimethylphenyl)-N'-(4'-chlorobenzoyl)-urea,
N-(3-amino-4-chlorophenyl)-N'-(4'-chlorobenzoyl)-urea,
N-(4-aminobenzoyl)-N'-(4'-chlorophenyl)-urea,
N-(4-aminobenzoyl)-N'-(2',4'-dichlorophenyl)-urea,
N-(4-amino-3-methylbenzoyl)-N'-(4'-chlorophenyl)-urea and
N-(4-aminobenzoyl)-N'-phenylurea.

Condensation between the carboxylic acid halides of the kind defined above and the amines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chlorides obtained from the carboxylic acids. In some cases however, isolation of the acid chlorides may be omitted without harm and condensation may be carried out immediately after preparation of the carboxylic acid chlorides.

In process (b) of the invention, the new pigments may be obtained by coupling a diazotized aromatic amine, preferably a diazotized aminobenzene, especially one of Formula 6, with a coupling component of Formula 4.

The coupling components mentioned may be obtained by condensing a 2,3-hydroxynaphthoic acid chloride with an amine of the Formula 3, especially an amine corresponding to one of the Formulae 7 to 10.

Coupling may be effected by gradual addition of an aqueous alkaline solution of the coupling component to an acidic solution of the diazonium salt. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkali solution of the coupling component advantageously contains a wetting agent, a dispersing agent or an emulsifying agent, for example, an aralkyl sulphonate, for example, dodecylbenzene sulphonate or the sodium salt of 1,1'-naphthylmethane sulphonic acid, polycondensation products of alkylene oxides, for example, the product obtained by reacting ethylene oxide with para-tertiary-octylphenol, and also the alkylesters of sulphoricinoleates, for example, n-butyl-sulphoricinoleate. The dispersion of the coupling component may also advantageously contain protective colloids, for example methylcellulose or small amounts of inert organic solvents which are sparingly soluble or insoluble in water, for example, aromatic hydrocarbons, which may be halogenated or nitrated, for example, benzene, toluene, xylene, chlorobenzene, dichlorobenzene or nitrobenzene, as well as aliphatic halogenated hydrocarbons, for example, carbon tetrachloride or trichloroethylene; also suitable are organic solvents miscible with water, for example, acetone, methylethyl-ketone, methanol, ethanol or isopropanol.

Coupling may also be carried out with advantage by continuously combining an acidic solution of the diazonium salt with an alkaline solution of the coupling component in a mixing nozzle whereby coupling takes place instantaneously. The pigment dispersion formed is removed continuously from the mixing nozzle and the pigment is isolated by filtration.

The aryldiazoamino compounds to be used in process (b) of the invention may be obtained by known methods by coupling an aryldiazonium salt with a primary or preferably secondary amine. A very wide variety of amines are suitable for this purpose, for example, aliphatic amines, for example, methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid and β-aminoethyl sulphonic acid; alicyclic amines, for example, cyclohexylamine, N-methylcyclohexylamine and dicyclohexylamine; aromatic amines, for example, 4-aminobenzoic acid, sulphanilic acid, 4-sulpho-2-aminobenzoic acid, (4-sulphophenyl)-guanidine, N-4-methylaminobenzoic acid, 4-ethylaminobenzoic acid, 1-aminonaphthalene-4-sulphonic acid and 1-aminonaphthalene - 2,4 - disulphonic acid; heterocyclic amines, for example, piperidine, morpholine, pyrrolidine, dihydroindole and also sodium cyanamide or dicyanodiamide.

Generally, the diazoamino compounds obtained are sparingly soluble in cold water and, if necessary, may be separated from the reaction medium in a crystalline form after salting out. In many cases, the moist press cake may be used as it is in further reactions. In some cases, it may be advantageous to dehydrate the diazoamino compounds by vacuum drying prior to the reaction.

Coupling of the diazoamino compound with the coupling component may be carried out in an organic solvent, for example, chlorobenzene, ortho-dichlorobenzene, nitrobenzene, pyridine, ethylene glycol, ethylene glycol monoethyl ether or ethylene glycol monomethyl ether, dimethylformamide, formic acid or acetic acid. When using a solvent which is miscible with water, it is not necessary to use the diazoamino compound in an anhydrous form. For example, the water-moist filter cake may be used.

Coupling may be advantageously carried out with the application of heat, preferably at a temperature within the range of from 80 to 180° C. in an acid medium, and it generally proceeds very quickly and is complete. When a neutral solvent is used it is advantageous to add an acid, for example, hydrochloric acid, sulphuric acid, formic acid or acetic acid. By virtue of their insolubility, the pigments obtained may be isolated from the reaction mixture by filtration. Thus, an after-treatment with an organic solvent, to which pigments that have been obtained by coupling in an aqueous medium have to be subjected, is not necessary in most cases.

The new products are valuable pigments that may be used for a very wide variety of purposes. For example, they may be used in a state of fine division for the spin-colouration of filament and staple-fibre viscose, cellulose ethers, cellulose esters, polyamides, polyurethanes and polyesters, and also in the production of coloured lacquers and lake-formers, solutions or products made from cellulose acetate, nitrocellulose, natural or synthetic resins, for example, polymerization resins or condensation resins, for example, aminoplasts, alkyd resins and phenoplasts, and also polyolefines, for example, polyethylene, polypropylene, polystyrene, polyvinyl chloride, polyacrylonitrile, rubber casein, silicones and silicone resins. They may also be used with advantage in the manufacture of coloured pencils, printing pastes, cosmetic preparations and laminated sheet material.

The following examples illustrate the invention. Unless otherwise stated, the parts and percentages are by weight.

EXAMPLE 1

47.5 parts of the dyestuff obtained by diazotizing 2,4,5-trichloroaniline with glacial acetic acid, hydrochloric acid and sodium nitrite, and coupling with 2,3-hydroxynaphthoic acid are heated for two hours at 135 to 145° C., with 650 parts of ortho-dichlorobenzene, 20 parts of thionyl chloride and 2 parts of dimethylformamide while stirring; dissolution is complete. After cooling the reaction mixture, the uniformly crystalline monocarboxylic acid chloride of the dyestuff is isolated by filtration and washed successively with 400 parts of benzene and 200 parts of petroleum ether. After drying in vacuo at 50 to 60° C., 39 parts of the dyestuff acid chloride are obtained in the form of a red crystalline powder.

5.0 parts of the acid chloride so obtained are stirred in 450 parts of ortho-dichlorobenzene and the batch is heated to 100° C. A warm solution of 2.4 parts of 4-aminophenyl-1-biuret in 20 parts of dimethylformamide is added and the batch is heated for 12 hours at 140 to 145° C. The finely crystalline, sparingly soluble pigment is then isolated by filtration while hot, washed with hot orthodichlorobenzene until the filtrate runs clear, and it is then washed successively with cold methanol and hot water. After drying in vacuo at 80 to 85° C., 4.4 parts of a soft powder are obtained which is virtually insoluble in the common solvents and which colours polyvinyl chloride film and also lacquers a brown shade possessing excellent fastness to light, migration and overstripe bleeding.

The pigment corresponds to the formula

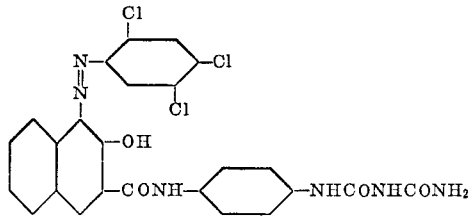

EXAMPLE 2

36.5 parts of the dyestuff obtained by coupling diazotized 2,5-dichloroaniline with 2,3-hydroxynaphthoic acid are heated for 2 hours at 135 to 145° C. while stirring, with 390 parts of ortho-dichlorobenzene, 16.5 parts of thionyl chloride and 2 parts of dimethylformamide; dissolution is complete. After cooling the reaction mixture, the uniformly crystalline azo dyestuff monocarboxylic acid chloride is isolated by filtration and washed successively with 400 parts of benzene and 200 parts of petroleum ether. After drying in vacuo at 50° C., 29.5 parts of a red crystalline powder are obtained.

5.7 parts of the azo dyestuff carboxylic acid chloride so obtained are stirred in 400 parts of dichlorobenzene and the batch is heated to 80 to 90° C. A warm suspension of 5.0 parts of N-(4-amino-2,5-dichlorophenyl)-N'-benzoylurea in 40 parts of dimethylformamide is added and the batch is heated for 12 hours at 140 to 145° C. The finely crystalline, sparingly soluble pigment that precipitates is then isolated by filtration while hot, washed with hot ortho-dichlorobenzene until the filtrate runs colourless, and it is then washed successively with cold methanol and hot water. After drying in vacuo at 80° C., 6.5 parts of a soft-grained powder are obtained which is virtually insoluble in the common solvents and which colours polyvinyl chloride film and also lacquers a red shade possessing excellent fastness to light, migration and overstripe bleeding.

The pigment corresponds to the formula

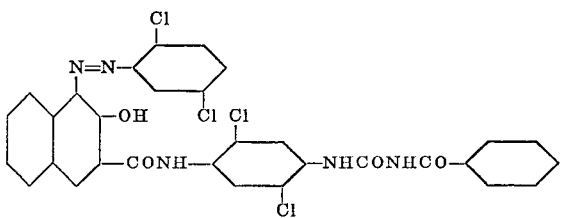

EXAMPLE 3

84 parts of the dyestuff obtained by diazotizing 5-trifluoromethyl-2-chloro-1-aminobenzene with aqueous hydrochloric acid and sodium nitrite, and coupling with 2,3-hydroxynaphthoic acid are heated for one hour at 75 to 80° C. with 1500 parts of benzene, 35 parts of thionyl chloride and 2 parts of dimethylformamide while stirring. After cooling the reaction mixture, the uniformly crystalline monocarboxylic acid chloride of the dyestuff is isolated by filtration, washed with cold benzene and then dried in vacuo at 50 to 60° C.

2.5 parts of the acid chloride so obtained are stirred in 230 parts of ortho-dichlorobenzene and the batch is heated to 90° C. A warm solution of 1.9 parts of 1-(4'-amino - 2',5' - dimethylphenylcarbamyl) - 2 - benzoylhydrazine in 10 parts of dimethylformamide is added and the batch is heated for 12 hours at 140 to 145° C. The finely crystalline, sparingly soluble pigment is then isolated by filtration while hot, washed successively with hot ortho-dichlorobenzene, cold methanol and hot water and then dried in vacuo at 70 to 80° C.

The product so obtained of the formula

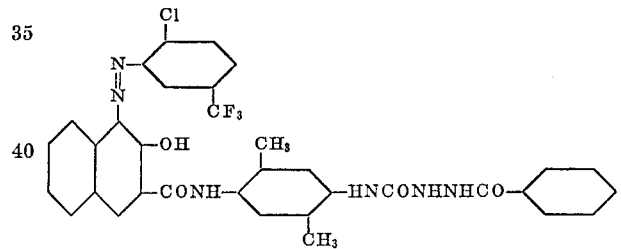

is an orange pigment which is sparingly soluble to insoluble in the common solvents and which colours polyvinyl chloride film and also lacquers an orange shade possessing excellent fastness to light, migration and overstripe bleeding.

A pigment having a similar shade and equally good properties of fastness may be obtained by replacing the 1-(4'-amino-2',5'-dimethylphenylcarbamyl) - 2 - benzoylhydrazine in the above example with an equivalent amount of N-(4-aminophenyl)-N'-acetic acid methylester urea. The pigment corresponds to the formula

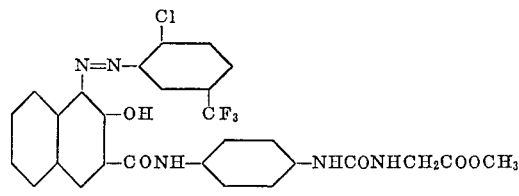

EXAMPLE 4

27.2 parts of the dyestuff obtained by diazotizing 4-methoxy-3-aminobenzoic acid-(2'-chloro-5'-trifluoromethyl)-phenylamide in glacial acetic acid and hydrochloric acid with sodium nitrite and coupling with 2,3-hydroxynaphthoic acid are heated for 10 hours at 55 to 60° C. with 650 parts of chlorobenzene, 11.5 parts of thionyl chloride and 3.5 parts of dimethylformamide while stirring. After cooling the reaction mixture, the uniformly crystalline monocarboxylic acid chloride of the dyestuff is isolated by filtration, washed with cold benzene and dried in vacuo at 50° C.

2.25 parts of the acid chloride so obtained are stirred in 150 parts of ortho-dichlorobenzene and the batch is heated to 70° C. A warm solution of 1.2 parts of N-(4-aminobenzoyl)-N'-(4'-chlorophenyl)-urea in 7 parts of dimethylformamide is added and the batch is heated for 12 hours at 140 to 145° C. The crystalline, sparingly soluble pigment is then isolated by filtration while hot, washed successively with hot ortho-dichlorobenzene, cold methanol and hot water, and dried in vacuo at 70 to 80° C. The product so obtained of the formula

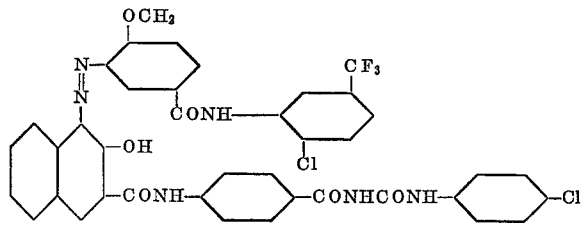

is a bluish red pigment that is sparingly soluble to insoluble in the common solvents and that colours polyvinyl chloride film and also lacquers a bluish red shade possessing excellent fastness to light, migration and overstripe bleeding.

EXAMPLE 5

17.3 parts of diazotized 2-nitro-4-chloroaniline are coupled in the usual manner with 18.8 parts of 2,3-hydroxynaphthoic acid. The azo dyestuff so obtained is dried and then converted into the azo dyestuff carboxylic acid halide with thionyl chloride in ortho-dichlorobenzene.

1.2 parts of the monoazo dyestuff carboxylic acid chloride so obtained are stirred in 130 parts of ortho-dichlorobenzene, and a hot solution of 0.75 part of γ-(4-aminophenyl)-allophanic acid ethyl ester in 5 parts of dimethylformamide is added at 80° C. The batch is heated to 140° C. and stirred for 8 hours at 140 to 145° C. The batch is then vacuum-filtered and the filter residue is washed successively with hot ortho-dichlorobenzene, cold methanol and hot water and dried in vacuo at 70 to 80° C.

The product so obtained of the formula

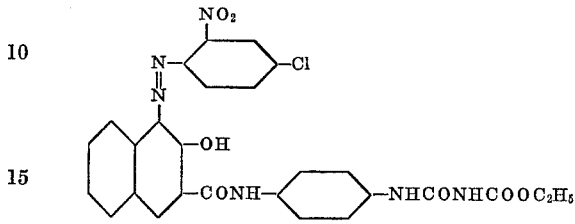

is a finely crystalline claret pigment that is sparingly soluble to insoluble in the common solvents.

It colours plastic materials, for example, polyvinyl chloride, and also lacquers a brilliant claret possessing very good fastness to migration, overstripe bleeding and light.

The following table lists components for making further monoazo pigments. The pigments may be obtained by coupling 1 mol of a diazo compound of an amine listed in column I with 1 mol of 2,3-hydroxynaphthoic acid as shown in column II in the manner described in the first paragraph of the above example, the monoazo dyestuff carboxylic acid so obtained is converted into the acid chloride, and the latter is condensed with 1 mol of an amine as listed in column III. The shades which the pigments produce in polyvinyl chloride film are indicated in column IV.

| | I | II | III | IV |
|---|---|---|---|---|
| 1 | 2,4,5-trichloroaniline | 2,3-hydroxynaphthoic acid | 4-amino-2,5-dimethylphenyl-1-biuret | Brown. |
| 2 | 2,5-dichloroaniline | do | do | Orange. |
| 3 | do | do | 4-aminophenyl-1-biuret | Red. |
| 4 | 2,5-dichloroaniline | 6-bromo-2,3-hydroxynaphthoic acid | 4-aminophenyl-a-biuret | Red. |
| 5 | do | do | 4-amino-2,5-dimethylphenyl-1-biuret | Red. |
| 6 | 2-chloro-5-trifluoromethylaniline | 2,3-hydroxynaphthoic acid | 4-aminophenyl-1-biuret | Orange. |
| 7 | 2-nitro-4-chloroaniline | do | do | Brown. |
| 8 | 2-nitro-4-trifluoromethylaniline | do | do | Do. |
| 9 | 3-amino-4-chlorobenzoic acid-2'-chloro-5'-trifluoromethylanilide | do | 4-amino-2,5-dimethylphenyl-1-biuret | Reddish orange. |
| 10 | 3-amino-4-chlorobenzoic acid-3'trifluoromethylanilide | do | 4-aminophenyl-1-biuret | Red. |
| 11 | 2-nitro-4-trifluoromethylanilline | do | N-(4-aminophenyl)-N'-phenylbiuret | Brown. |
| 12 | 2,5-dichloroaniline | do | do | Orange. |
| 13 | do | do | N-(4-amino-2,5-dimethylphenyl)-N'-phenylbiuret | Red. |
| 14 | 3-amino-4-chlorobenzoic acid-2'-chloro-5'-trifluoromethylanilide | do | N-(4-aminophenyl)-N'-phenylbiuret | Red. |
| 15 | 2-methoxy-4-nitroaniline | do | 1-(4'-amino)-phenylcarbamyl-2-benzoyl-hydrazine | Claret. |
| 16 | 2-chloro-5-trifluoromethylaniline | do | do | Orange. |
| 17 | 2,5-dichloroaniline | do | do | Red. |
| 18 | do | do | 1-(4'-amino-2',5'-dimethyl)-phenyl-carbamyl-2-benzoyl hydrazine | Red. |
| 19 | 2,4,5-trichloroaniline | do | do | Red. |
| 20 | 3-amino-4-chlorobenzoic acid-2'-methyl-3'-chloroanilide | do | 1-(4'-aminophenylcarbamyl)-2-benzoyl-hydrazine | Reddish orange. |
| 21 | 3-amino-4-chlorobenzoic acid-3'-carbomethoxyanilide | do | do | Do. |
| 22 | 3-amino-4-methylbenzoic acid-3'-trifluoromethylanilide | do | do | Red. |
| 23 | 3-amino-4,6-dichlorobenzoic acid-2',4'-dichloroanilide | do | do | Red. |
| 24 | 2,5-dichloroaniline | 6-methoxy-2,3-hydroxynaphthoic acid | 1-(4'-amino-2',5'-dimethylphenyl-carbamyl)-2-benzoylhydrazine | Bluish red. |
| 25 | 3-amino-4,6-dichlorobenzoic acid-2',4'-dichloroanilide | 2,3-hydroxynaphthoic acid | γ-(4-aminophenyl)-allophanic acid ethylester | Brown. |
| 26 | 3-amino-4-methoxybenzoic acid-3'-trifluoromethylanilide | do | N-(4-amino-3-chloro-6-methoxyphenyl)-N'-acetic acid methylester urea | Bluish red. |
| 27 | 3-amino-4-methylbenzoic acid-3'-trifluoromethylanilide | do | do | Red. |
| 28 | 2,5-dichloroaniline | do | N-(3-chloro-4-amino-6-methoxyphenyl)-N'-benzoylurea | Brown. |
| 29 | 2-nitro-4-trifluoromethylaniline | do | N-(3-amino-4-methylphenyl)-N'-benzoylurea | Red. |
| 30 | 2-chloro-5-trifluoromethylaniline | do | N-(4-aminophenyl)-N'-benzoylurea | Orange. |
| 31 | 2-methoxy-4-nitroaniline | do | do | Bluish red. |
| 32 | 3-amino-4-methylbenzoic acid-3'-trifluoromethylanilide | do | N-(4-aminophenyl)-N'-4'-chloro-benzoylurea | Red. |
| 33 | 3-amino-4-methoxybenzoic acid-3'-trifluoromethylanilide | do | N-(4-aminophenyl)-N'-benzoylurea | Bluish red. |
| 34 | 3-amino-4-chlorobenzoic acid-3'-trifluoromethylanilide | do | do | Red. |
| 35 | 2-nitro-4-trifluoromethylaniline | do | N-(4-aminobenzoyl)-N'-(4'-chlorophenyl)-urea | Orange. |

TABLE—Continued

| I | II | III | IV |
|---|---|---|---|
| 36 | 3-amino-4-chlorobenzoic acid-3′-trifluoromethylanilide. | 2,3-hydroxynapthalene acid | N-(4-aminophenyl)-N′-acetylurea | Red. |
| 37 | 2,5-dichloroaniline | do | N-(4-aminophenyl)-N′-methylbiuret | Red. |
| 38 | 3-amino-4-chlorobenzoic acid-2′-chloro-5′-trifluoromethylanilide. | do | 1-(4′-aminophenyl)-carbamyl-2-formylhydrazine. | Orange. |
| 39 | do | do | 1-(4′-aminophenyl)-carbamyl-2-acetylhydrazine. | Red. |
| 40 | 2,5-dichloroaniline | 6-nitro-2,3-hydroxynaphthoic acid | 4-amino-2,5-dimethylphenyl-1-biuret | Red. |
| 41 | do | 2,3-hydroxynaphthoic acid | N-(4-aminophenyl)-N′-α-naphthylbiuret | Reddish orange. |
| 42 | do | do | N-(4-aminophenyl)-N′-benzoylurea | Red. |
| 43 | do | 6-bromo-2,3-hydroxynaphthoic acid | N-(4-amino-2,5-dimethylphenyl)-N′-benzoylurea. | Brown. |
| 44 | do | 6-methoxy-2,3-hydroxynaphthoic acid | do | Claret. |
| 45 | do | 2,3-hydroxynaphthoic acid | do | Brown. |
| 46 | do | 6-nitro-2,3-hydroxynpahthoic acid | N-(4-amino-2,5-dichlorophenyl)-N′-benzoylurea. | Red. |
| 47 | do | do | N-(4-aminophenyl)-N′-benzoylurea | Brown. |
| 48 | do | 6-bromo-2,3-hydroxynaphthoic acid | 1-(4′-amino-2′,5′-dimethylphenyl)-carbamyl-2-benzoylhydrazine. | Red. |
| 49 | do | 2,3-hydroxynaphthoic acid | 1-(3′-amino-4′-methylphenyl)-carbamyl-2-(2″,5″-dichloro)-benzoylhydrazine. | Orange. |
| 50 | do | do | 1-(4′-aminophenyl)-carbamyl-2-(4″-methylbenzoyl)-hydrazine. | Red. |
| 51 | do | do | 1-(4′-amino-2′-methoxy-6′-chloro)-phenylcarbamyl-2-(4″-methoxybenzoyl)-hydrazine. | Red. |
| 52 | do | 6-nitro-2,3-hydroxynaphthoic acid | 1-(4′-aminophenyl)-carbamyl-2-(3″,4″-dichlorobenzoyl)-hydrazine. | Bluish red. |
| 53 | do | 6-bromo-2,3-hydroxynaphthioc acid | 1-(4′-aminophenyl)-carbamyl-2-(2″,4″-dichlorobenzoyl)-hydrazine. | Red. |
| 54 | 2-nitro-4-trifluoromethylaniline | 2,3-hydroxynaphthoic acid | 1-(3′-amino-4′-methylphenyl)-carbamyl-2-(2″,5″-dichlorobenzoyl)-hydrazine. | Orange. |
| 55 | do | do | 1-(3′-aminophenyl)-carbamyl-2-benzoylbenzoylhydrazine. | Do. |
| 56 | 2-chloro-5-trifluoromethylaniline | do | 1-(4′-aminophenyl)-carbamyl-2-(4″-methylbenzoyl)-hydrazine. | Red. |
| 57 | 2-benzylsulphone-5-trifluoromethylaniline. | do | 1-(4′-aminophenyl)-carbamyl-2-benzoylhydrazine. | Orange. |
| 58 | do | do | 4-amino-2,5-dimethylphenyl-1-biuret | Do. |
| 59 | 3-amino-4-methylbenzoic acid phenylester | do | 1-(4′-aminophenyl)-carbamyl-2-(4″-methylbenzoyl)-hydrazine. | Scarlet. |
| 60 | 3-amino-4-methylbenzoic acid-4′-chlorophenyl ester. | do | do | Do. |
| 61 | do | do | 1-(4′-amino-2′,5′-dimethylphenyl)-carbamyl-2-benzoylhydrazine. | Do. |
| 62 | 2-ethylsulfonyl-5-trifluoromethylaniline | do | 1-(4′-aminophenyl)-2-(4″-methylbenzoyl)-hydrazine. | Orange. |

EXAMPLE 6

3.25 parts of 2,5-dichloro-1-aminobenzene are diazotized in the usual manner with aqueous hydrochloric acid, ice and sodium nitrite.

Separately from this, 7.85 parts of 4-(2″-hydroxy-3′-naphthoylamino)-2,5-dimethylphenyl - 1 - biuret are dissolved cold in a mixture of 150 parts of ethanol, 50 parts of water and 5.0 parts of 30% sodium hydroxide solution. 1 part of the condensation product obtained from 8 mols of ethylene oxide and 1 mol of para-tertiary-octylphenol is added to the solution, and the naphthol is then precipitated with acetic acid while vigorously stirring. Coupling is effected by the addition of the diazo solution described in the preceding paragraph at a pH value of 5.5 to 6.5 and a temperature of 15 to 20° C. The batch is stirred for 1 hour at the same temperature to complete the coupling and then for 1 hour at 70 to 80° C. The pigment suspension so formed is rendered acid to Congo paper by the addition of hydrochloric acid and then filtered. The product is washed with hot water until chlorine ions are no longer detectable in the filtrate and then dried in vacuo at 80 to 90° C. An orange pigment of the formula

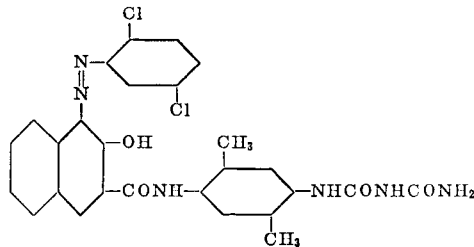

is obtained in a good yield.

The properties of the pigment can be improved by an after-treatment in an organic solvent, for example, nitrobenzene. It is sparingly soluble to insoluble in the common solvents and colours polyvinyl chloride film and also lacquers a reddish orange shade possessing good fastness to migration, overstripe bleeding and light.

EXAMPLE 7

1.5 parts of the diazoamino compound of the formula

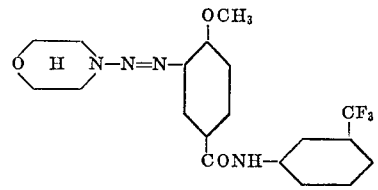

prepared by coupling diazotized 3-amino-4-methoxybenzoic acid-3′-trifluoromethylanilide with morpholine in an alkaline medium, and 1.4 parts of N-[3-chloro-6-methoxy-4-(2″-hydroxy - 3″ - naphthoylamino)-phenyl]-N′-acetic acid methylester urea are suspended in 130 parts of ortho-dichlorobenzene, the suspension is heated to 120 to 125° C., and 8 parts of glacial acetic acid are added. The batch is then stirred for 1 hour at 145 to 150° C., during which cleavage of the diazoamino compound and coupling to form the pigment is completed. The red pigment is isolated by filtration while hot, washed successively with hot ortho-dichlorobenzene, cold methanol and hot water and then dried in vacuo at 80° C. 1.8 parts of a bluish red monoazo pigment of the formula

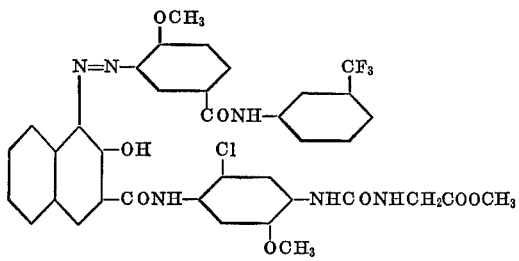

are obtained in a soft form. It is sparingly soluble to insoluble in the common solvents and colours polyvinyl chloride film and also lacquers a bluish red shade possessing good fastness to migration, overstripe bleeding and light.

EXAMPLE 8

A mixture is prepared from 65 parts of stabilized polyvinyl chloride, 35 parts of dioctyl phthalate and 0.2 part of the pigment obtained in the manner described in Example 1 and then worked to and fro for 7 minutes on a two-roller mill at 140° C. A pure, brown film is obtained possessing very good fastness to light and migration.

I claim:
1. An azo pigment of the formula

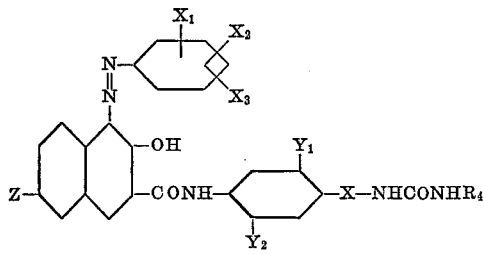

in which $X_1$ is hydrogen, chloro, bromo or lower alkyl, $X_2$ and $X_3$ each is hydrogen, chloro, bromo, lower alkyl, lower alkoxy, phenoxy, nitro, cyano, lower carbalkoxy, carbophenoxy, lower alkylsulfonyl, trifluoromethyl or a group of the formula —CONHR, in which R is hydrogen, lower alkyl, phenyl or phenyl substituted by chlorine, lower, alkyl, lower alkoxy, trifluoromethyl or lower carbalkoxy, Z is hydrogen, bromine, lower alkoxy, nitro or cyano, $Y_1$ and $Y_2$ each is hydrogen, halogen, lower alkyl or lower alkoxy, X is a direct bond when $R_4$ is —$COR_5$, —$NHCOR_6$ or —$CH_2COO$— lower alkyl, or X is —CO— when $R_4$ is lower alkyl, phenyl or phenyl substituted by chlorine, lower alkyl, lower alkoxy, trifluoromethyl or cyano; $R_5$ is amino, lower alkyl amino, lower alkyl, lower alkoxy, phenyl, naphthylamino, anilino or anilino substituted by chlorine, lower alkyl, lower alkoxy or trifluoromethyl; and $R_6$ is hydrogen, lower alkyl, phenyl or phenyl substituted by chlorine, lower alkyl or lower alkoxy.

2. The compound as claimed in claim 1 of the formula

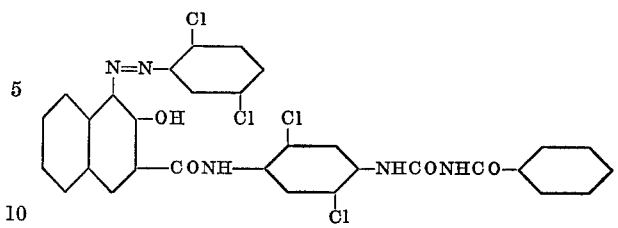

3. The compound as claimed in claim 1 of the formula

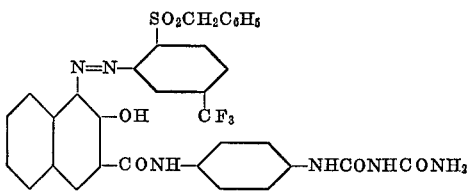

4. The compound as claimed in claim 1 of the formula

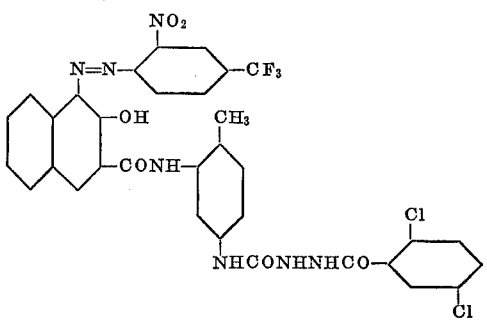

5. The compound as claimed in claim 1 of the formula

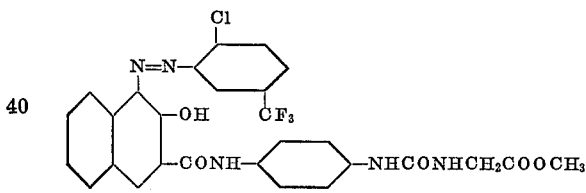

6. The compound as claimed in claim 1 of the formula

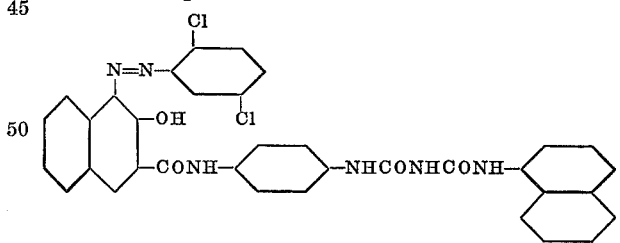

References Cited
UNITED STATES PATENTS
3,472,834  10/1969  Ronco et al. _____ 260—204 X JOSEPH REBOLD, Primary Examiner
C. F. WARREN, Assistant Examiner U.S. Cl. X.R.
260—140, 204, 553, A, B, E, 554, 31.8 PQ, 41.5 R